US010414355B2

(12) United States Patent
Lange et al.

(10) Patent No.: US 10,414,355 B2
(45) Date of Patent: Sep. 17, 2019

(54) SYSTEMS AND METHODS FOR REAR DOOR LOCK AND WINDOW BLOCK-OUT

(71) Applicant: GM Global Technology Operations LLC, Detroit, MI (US)

(72) Inventors: Richard Lange, Troy, MI (US); Frank J. Arabia, Macomb, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 159 days.

(21) Appl. No.: 15/625,199

(22) Filed: Jun. 16, 2017

(65) Prior Publication Data

US 2018/0361955 A1 Dec. 20, 2018

(51) Int. Cl.
*B60R 16/023* (2006.01)
*B60R 25/20* (2013.01)
*E05F 15/60* (2015.01)
*E05B 77/48* (2014.01)
*E05B 81/54* (2014.01)
*E05B 81/76* (2014.01)
*E05B 85/08* (2014.01)

(52) U.S. Cl.
CPC ........ *B60R 16/023* (2013.01); *B60R 25/2018* (2013.01); *E05B 77/48* (2013.01); *E05B 81/54* (2013.01); *E05B 81/76* (2013.01); *E05B 85/08* (2013.01); *E05F 15/60* (2015.01); *E05Y 2900/55* (2013.01)

(58) Field of Classification Search
None
See application file for complete search history.

(56) References Cited

U.S. PATENT DOCUMENTS

| 4,176,250 A * | 11/1979 | Berglind | H04Q 9/14 307/10.1 |
| 6,053,543 A * | 4/2000 | Arabia, Jr. | E05B 81/06 292/201 |
| 2012/0232749 A1* | 9/2012 | Schoenberg | B60N 2/002 701/36 |
| 2015/0367789 A1* | 12/2015 | Drake | B60R 16/023 701/1 |
| 2018/0264910 A1* | 9/2018 | Guerineau | B60H 1/00378 |
| 2018/0272911 A1* | 9/2018 | Ramirez Monarrez | E05B 77/24 |

* cited by examiner

*Primary Examiner* — Kimberly S Berona
*Assistant Examiner* — Abdhesh K Jha

(57) ABSTRACT

A window and lock control system of a vehicle includes a window control module configured to actuate a window actuator based on a second signal from a power window switch of the rear door when a first signal from a block-out switch of the vehicle is in a first state. When the first signal is in a second state, the window control module does not actuate the window actuator based on the second signal from the power window switch. A lock control module actuates a lock actuator and locks and unlocks the rear door based on a third signal from a power door lock (PDL) switch of the rear door when the first signal is in the first state. When the first signal is in the second state, the lock control module selectively does not actuate the lock actuator based on the third signal from the PDL switch.

18 Claims, 6 Drawing Sheets

SYSTEMS AND METHODS FOR REAR DOOR LOCK AND WINDOW BLOCK-OUT

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to switches of rear doors of vehicles and more particularly to systems and methods for blocking out operability of the power door lock switches of rear doors.

Vehicles may include one or more power door lock (PDL) switches that lock and unlock all of the doors of the vehicles. For example, a vehicle may include a PDL switch at each front door of the vehicle that lock and unlock all of the front and rear doors of the vehicle.

The vehicle can also include a driver information center, for example, in a center stack of the vehicle. The driver information center can include a touchscreen display that displays information regarding vehicle settings and other information. For example, the driver information center can display temperature information, display settings of the vehicle, and provide the ability to adjust various settings of the vehicle.

SUMMARY

A window and lock control system of a vehicle includes a window control module configured to actuate a window actuator based on a second signal from a power window switch of the rear door when a first signal from a block-out switch of the vehicle is in a first state. When the first signal is in a second state, the window control module does not actuate the window actuator based on the second signal from the power window switch. A lock control module actuates a lock actuator and locks and unlocks the rear door based on a third signal from a power door lock (PDL) switch of the rear door when the first signal is in the first state. When the first signal is in the second state, the lock control module selectively does not actuate the lock actuator based on the third signal from the PDL switch.

In other features, the lock control module is further configured to, when the first signal from the block-out switch is in the first state, actuate the lock actuator of the rear door and lock the rear door when the third signal from the PDL switch of the rear door is in a first state and actuate the lock actuator of the rear door and unlock the rear door when the third signal from the PDL switch of the rear door is in a second state. When the first signal from the block-out switch is in the second state, actuate the lock actuator of the rear door and lock the rear door when the third signal from the PDL switch of the rear door is in the first state and not actuate the lock actuator of the rear door and not unlock the rear door when the third signal from the PDL switch of the rear door is in the second state.

In other features, the lock control module is further configured to, when the first signal from the block-out switch is in the first state, actuate the lock actuator of the rear door and lock the rear door when the third signal from the PDL switch of the rear door is in a first state and actuate the lock actuator of the rear door and unlock the rear door when the third signal from the PDL switch of the rear door is in a second state. When the first signal from the block-out switch is in the second state, not actuate the lock actuator of the rear door and not lock the rear door when the third signal from the PDL switch of the rear door is in the first state and not actuate the lock actuator of the rear door and not unlock the rear door when the third signal from the PDL switch of the rear door is in the second state.

In other features, the lock control module is further configured to, when the first signal from the block-out switch is in the second state and the rear door is open, actuate the lock actuator of the rear door and lock the rear door when the third signal from the PDL switch of the rear door is in a first state and actuate the lock actuator of the rear door and unlock the rear door when the third signal from the PDL switch of the rear door is in a second state. When the first signal from the block-out switch is in the second state and the rear door is not open, not actuate the lock actuator of the rear door and not lock the rear door when the third signal from the PDL switch of the rear door is in the first state and not actuate the lock actuator of the rear door and not unlock the rear door when the third signal from the PDL switch of the rear door is in the second state.

In other features, the lock control module is further configured to, when a fourth signal indicative of user input for the rear door is in a first state, not actuate the lock actuator of the rear door and not lock the rear door when the third signal from the PDL switch of the rear door is in a first state and not actuate the lock actuator of the rear door and not unlock the rear door when the third signal from the PDL switch of the rear door is in a second state. When the fourth signal is in a second state, actuate the lock actuator of the rear door and lock the rear door when the third signal from the PDL switch of the rear door is in the first state and actuate the lock actuator of the rear door and unlock the rear door when the third signal from the PDL switch of the rear door is in a second state.

In other features, the lock control module is further configured to, independently of the third signal from the PDL switch of the rear door, actuate the lock actuator of the rear door and lock the rear door when a vehicle speed is greater than a predetermined speed. In other features, the lock control module is further configured to, when the first signal from the block-out switch is in the second state, selectively actuate the lock actuator of the rear door independently of the third signal from the PDL switch of the rear door in response to a determination that the rear door is unlocked. In other features, the lock control module is further configured to, when the first signal from the block-out switch is in the second state, selectively actuate the lock actuator of the rear door independently of the third signal from the PDL switch of the rear door a predetermined period after the rear door transitions from locked to unlocked.

In other features, the lock control module is further configured to, when the first signal from the block-out switch is in the first state, further actuate a second lock actuator of a front door and lock and unlock the front door based on the third signal from the PDL switch of the rear door and, when the first signal from the block-out switch is in the second state, selectively not actuate the second lock actuator of the front door based on the third signal from the PDL switch of the rear door. In other features, the lock control module is further configured to, independently of the first signal from the block-out switch, actuate the lock actuator of the rear door and lock the rear door when a fourth signal from a second PDL switch of the front door is in a first state and actuate the lock actuator of the rear door and unlock the rear door when the fourth signal from the second PDL switch of the front door is in a second state.

A window and lock control method of a vehicle includes, when a first signal from a block-out switch of the vehicle is in a first state, actuating a window actuator of a rear door of the vehicle based on a second signal from a power window switch of the rear door. The method includes, when the first signal from the block-out switch is in a second state, not actuating the window actuator of the rear door based on the second signal from the power window switch of the rear door. The method also includes, when the first signal from the block-out switch is in the first state, actuating a lock actuator of the rear door and locking and unlocking the rear door based on a third signal from a power door lock (PDL) switch of the rear door. The method further includes, when the first signal from the block-out switch is in the second state, selectively not actuating the lock actuator of the rear door based on the third signal from the PDL switch of the rear door.

In other features, when the first signal from the block-out switch is in the first state, actuating the lock actuator of the rear door and locking and unlocking the rear door based on a third signal from the PDL switch of the rear door includes actuating the lock actuator of the rear door and locking the rear door when the third signal from the PDL switch of the rear door is in a first state and actuating the lock actuator of the rear door and unlocking the rear door when the third signal from the PDL switch of the rear door is in a second state. When the first signal from the block-out switch is in the second state, selectively not actuating the lock actuator of the rear door based on the third signal from the PDL switch of the rear door includes actuating the lock actuator of the rear door and locking the rear door when the third signal from the PDL switch of the rear door is in the first state and not actuating the lock actuator of the rear door and not unlocking the rear door when the third signal from the PDL switch of the rear door is in the second state.

In other features, when the first signal from the block-out switch is in the first state, actuating the lock actuator of the rear door and locking and unlocking the rear door based on a third signal from the PDL switch of the rear door includes actuating the lock actuator of the rear door and locking the rear door when the third signal from the PDL switch of the rear door is in a first state and actuating the lock actuator of the rear door and unlocking the rear door when the third signal from the PDL switch of the rear door is in a second state. When the first signal from the block-out switch is in the second state, selectively not actuating the lock actuator of the rear door based on the third signal from the PDL switch of the rear door includes not actuating the lock actuator of the rear door and not locking the rear door when the third signal from the PDL switch of the rear door is in the first state and not actuating the lock actuator of the rear door and not unlocking the rear door when the third signal from the PDL switch of the rear door is in the second state.

In other features, the method includes, when the first signal from the block-out switch is in the second state and the rear door is open, actuating the lock actuator of the rear door and locking the rear door when the third signal from the PDL switch of the rear door is in a first state and actuating the lock actuator of the rear door and unlocking the rear door when the third signal from the PDL switch of the rear door is in a second state. The method further includes, when the first signal from the block-out switch is in the second state and the rear door is not open, not actuating the lock actuator of the rear door and not locking the rear door when the third signal from the PDL switch of the rear door is in the first state and not actuating the lock actuator of the rear door and not unlocking the rear door when the third signal from the PDL switch of the rear door is in the second state.

In other features, the method includes, when a fourth signal indicative of user input for the rear door is in a first state, not actuating the lock actuator of the rear door and not locking the rear door when the third signal from the PDL switch of the rear door is in a first state and not actuating the lock actuator of the rear door and not unlocking the rear door when the third signal from the PDL switch of the rear door is in a second state. The method includes, when the fourth signal is in a second state, actuating the lock actuator of the rear door and locking the rear door when the third signal from the PDL switch of the rear door is in the first state and actuating the lock actuator of the rear door and unlocking the rear door when the third signal from the PDL switch of the rear door is in a second state. In other features, the method includes, independently of the third signal from the PDL switch of the rear door, actuating the lock actuator of the rear door and locking the rear door when a vehicle speed is greater than a predetermined speed. In other features, the method includes, when the first signal from the block-out switch is in the second state, selectively actuating the lock actuator of the rear door independently of the third signal from the PDL switch of the rear door in response to a determination that the rear door is unlocked. In other features, the method includes, when the first signal from the block-out switch is in the second state, selectively actuating the lock actuator of the rear door independently of the third signal from the PDL switch of the rear door a predetermined period after the rear door transitions from locked to unlocked.

In other features, the method includes, when the first signal from the block-out switch is in the first state, actuating a second lock actuator of a front door and locking and unlocking the front door based on the third signal from the PDL switch of the rear door. The method also includes, when the first signal from the block-out switch is in the second state, selectively not actuating the second lock actuator of the front door based on the third signal from the PDL switch of the rear door. In other features, the method includes, independently of the first signal from the block-out switch, actuating the lock actuator of the rear door and locking the rear door when a fourth signal from a second PDL switch of the front door is in a first state and actuating the lock actuator of the rear door and unlocking the rear door when the fourth signal from the second PDL switch of the front door is in a second state.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A vehicle includes one power door lock (PDL) switch associated with each front and each rear door of the vehicle. The PDL switch of a door can be actuated to lock and unlock all of the doors of the vehicle. In some implementations, a PDL switch of a door may lock and unlock only a subset of the doors (e.g., only the door of the PDL switch) instead of locking and unlocking all of the doors of the vehicle. Each door also has an associated power window switch. A power window switch of a door can be actuated to open and close a window of the door.

A block-out switch is located near a driver's seat of the vehicle (e.g., on the front driver's side door) and can be actuated to disable operability of the power window switches of the rear doors. According to the present application, the block-out switch also disables the operability of the PDL switches of the rear doors of the vehicle. The block-out switch can therefore also be used to prevent rear seat passengers from locking and unlocking the doors of the vehicle via the PDL switches of the rear doors.

Figure 1:
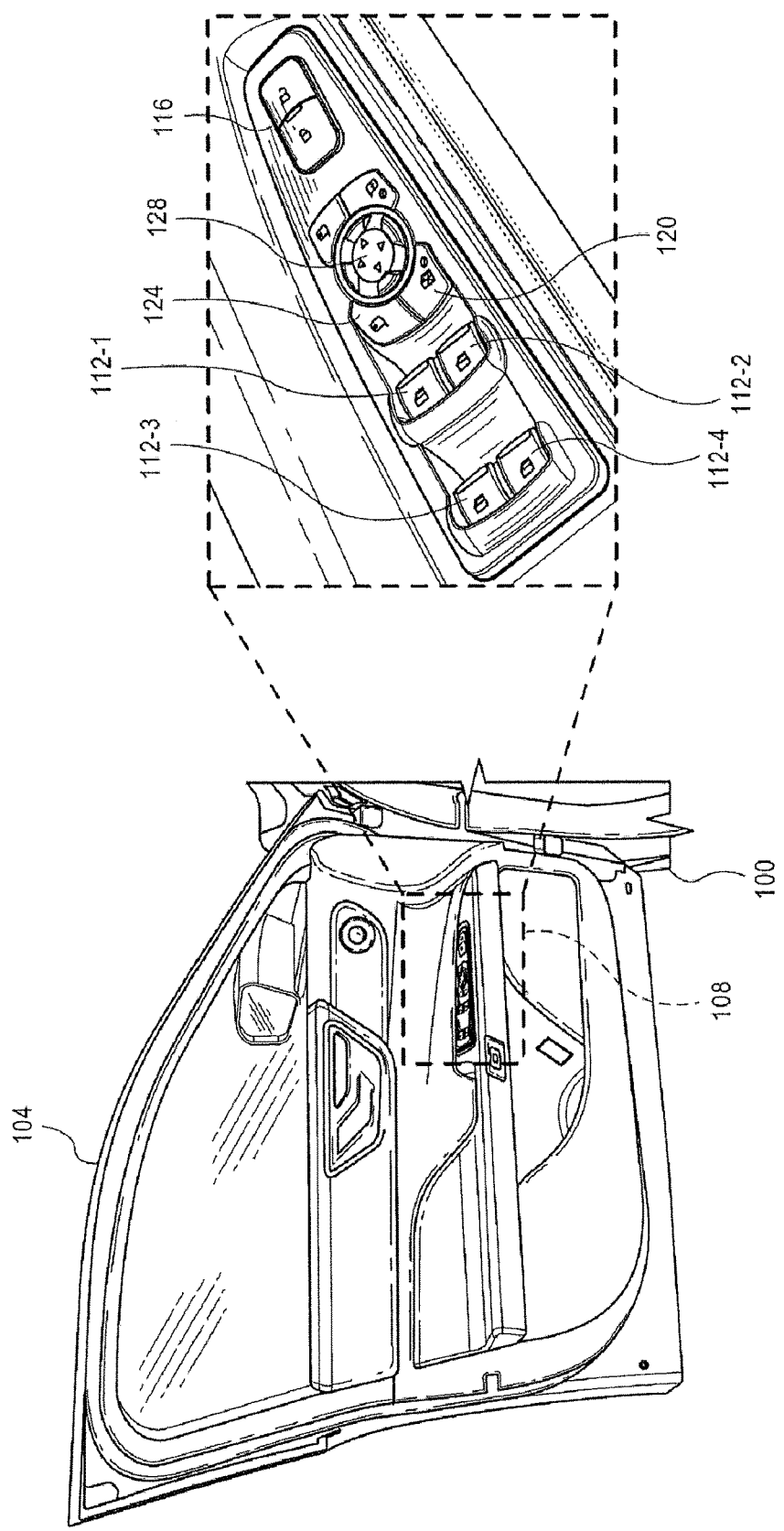
FIG. 1 is a front driver's side door of a vehicle.
Figure 2:
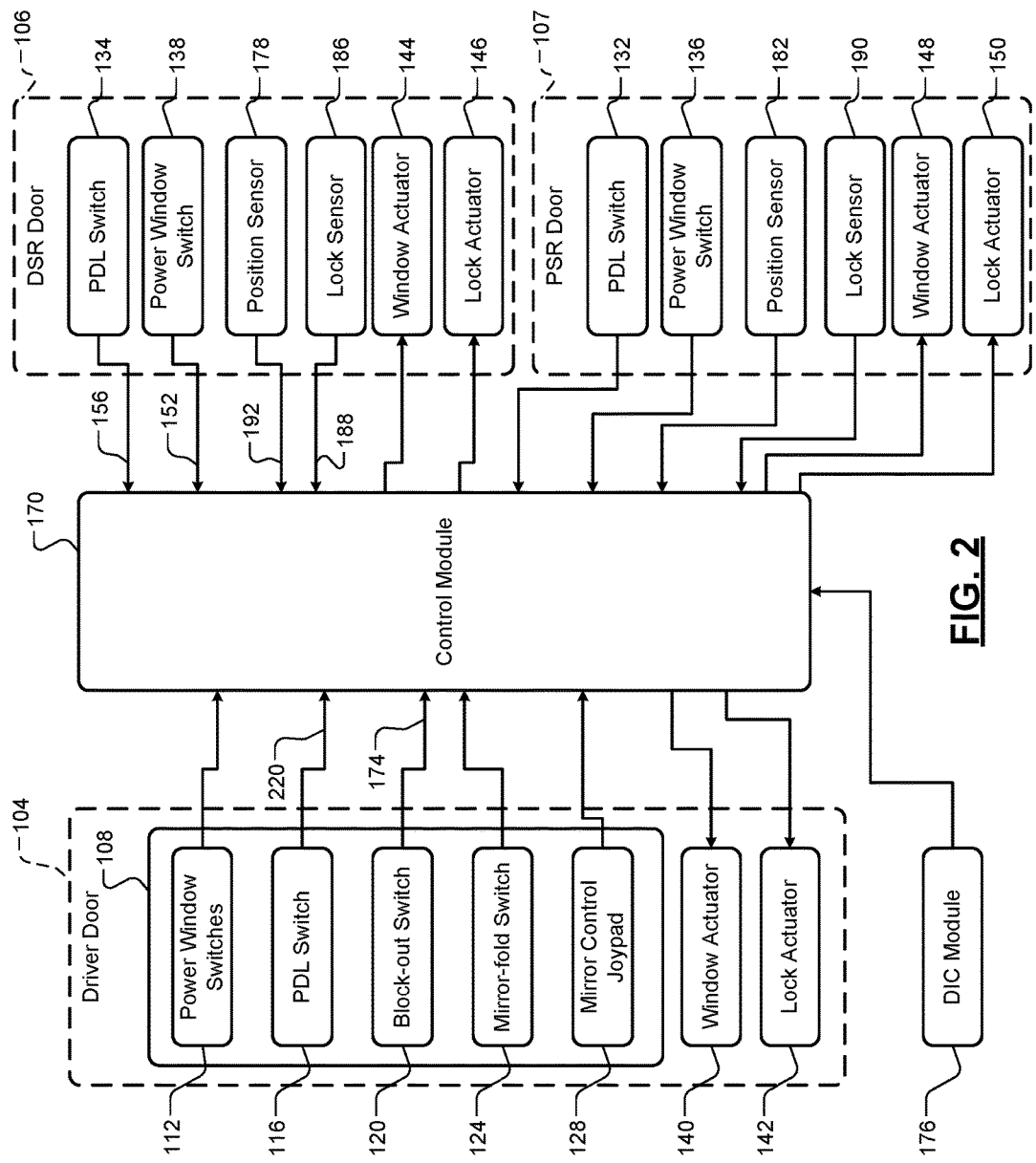
FIG. 2 is a functional block diagram of an example implementation of a vehicle locking system with a block-out switch.

FIG. 1 includes an example illustration including a front driver side door 104 of a vehicle 100. FIG. 2 includes a functional block diagram of an example implementation of a vehicle locking system.

Referring now to FIGS. 1 and 2, the vehicle 100 includes the front driver side door 104 and at least one rear door. For example, the vehicle 100 may include the front driver side door 104, a front passenger side door, a driver side rear (DSR) door 106, and a passenger side rear (PSR) door 107.

The front driver side door 104 includes a driver control panel 108. The driver control panel 108 includes a plurality of input devices (e.g., switches) for a user to actuate or press to perform various functions. While the driver control panel 108 is shown on the front driver side door 104, the driver control panel 108 may be located elsewhere near the driver side seat, such as on a center console or elsewhere within a predetermined distance from the driver's seat.

The driver control panel 108 includes power window switches 112-1, 112-2, 112-3, and 112-4, collectively power window switches 112, a PDL switch 116, and a block-out switch 120. The driver control panel 108 may also include a mirror-fold switch 124, a mirror control joypad 128, and/or one or more other switches or other types of input devices. In various implementations, the mirror fold-switch 124 and/or the mirror control joypad 128 may be omitted. The mirror-fold switch 124 may fold one or more side rear view mirrors of the vehicle inward and away from the body of the vehicle 100. The mirror control joypad 128 may tilt a selected side rear view mirror up, down, left, and right. One or none of the side rear view mirrors may be selected via one or more input devices, such one or more side rear view mirror switches.

Each of the power window switches 112 of the driver control panel 108 can be used to open and close an associated window of the vehicle 100. For example, the power window switch 112-1 may be used to open and close a window of the front driver side door 104, and the power window switch 112-2 may be used to open and close a window of the front passenger side door. The power window switch 112-3 may be used to open and close a window of the DSR door 106, and the power window switch 112-4 may be used to open and close a window of the PSR door 107.

Each of the other doors of the vehicle may also include a power window switch that can be used to open and close a window of that door. For example, the DSR door 106 includes a power window switch 138 that can be used to open and close a window of the DSR door 106. The PSR door 107 includes a power window switch 136 that can be used to open and close a window of the PSR door 107. The front passenger side door may also include a power window switch that can be used to open and close a window of the front passenger side door.

Each of the other doors of the vehicle may also include a PDL switch. For example, the DSR door 106 includes a PDL switch 134 that can be used to unlock and lock the DSR door 106. The PSR door 107 includes a PDL switch 132 that can be used to unlock and lock the PSR door 107. The front passenger side door may also include a PDL switch that can be used to unlock and lock the front passenger side door.

Each of the doors includes a plurality of actuators that actuate to open and close the window of that door and to unlock and lock that door. For example, the front driver side door 104 includes a window actuator 140 that actuates to open (e.g., lower) and close (e.g., lift) the window of the front driver side door 104. The front driver side door 104 also includes a lock actuator 142 that locks and unlocks the front driver side door 104.

The DSR door 106 also includes a window actuator 144 that actuates to open (e.g., lower) and close (e.g., lift) the window of the DSR door 106. The DSR door 106 also includes a lock actuator 146 that locks and unlocks the DSR door 106. The PSR door 107 also includes a window actuator 148 that actuates to open (e.g., lower) and close (e.g., lift) the window of the DSR door 106. The PSR door 107 also includes a lock actuator 150 that locks and unlocks the DSR door 106.

When a door is locked, actuation of an interior door handle of the door is ineffective to allow the door to be opened. When the door is locked, actuation of an exterior door handle of the door is also ineffective to allow the door to be opened. For example, a latching mechanism of the door may not be actuated by actuation of the interior door handle and actuation of the exterior door handle when the door is locked. This may be true for the rear doors but may not be true for the front doors.

When the door is unlocked (assuming that a child safety mechanism of the door, if present, is inactive), actuation of the interior door handle of the door and actuation of the exterior door handle allow the door to be opened. For example, the latching mechanism of the door actuate and allow the door to be opened in response to actuation of the interior door handle and actuation of the exterior door handle. This is also true for both front and rear doors. Child safety mechanisms may be installed, for example, on one or more rear doors.

Each of the PDL switches can be used to unlock and lock all of the doors (the front and rear doors) of the vehicle 100. For example, the PDL switch 116 of the driver control panel 108 (and the front driver side door 104) can be used to unlock and lock all of the doors of the vehicle 100. The PDL switch of the front passenger side door may also be used to unlock and lock all of the doors of the vehicle 100. The PDL switch 134 of the DSR door 106 and the PDL switch 132 of the PSR door 107 may also be used to unlock and lock all of the doors of the vehicle 100.

Alternatively, the PDL switch of one or more of the doors may be used to unlock and lock only a subset of the doors. For example, the PDL switches of the rear doors may be used to unlock and lock only the rear doors or only the one door with which they are associated. For example, the PDL switch 134 of the DSR door 106 may be used to unlock and lock only the DSR door 106 and the PSR door 107 or only the DSR door 106. The PDL switch 132 of the PSR door 107 may be used to unlock and lock only the DSR door 106 and the PSR door 107 or only the PSR door 107.

The power window switches 112, 138, and 136 generate respective power window signals based on user input to the respective power window switches 112, 138, and 136. For example, the power window switch 138 generates a power window signal 152 based on user input to the power window switch 138. The power window switch 138 may set the power window signal 152 to a first state when the power window switch 138 is actuated to a first position (e.g., window up/closed). The power window switch 138 may set the power window signal 152 to a second state when the power window switch 138 is actuated to a second position (e.g., window down/open). The power window switch 138 may set the power window signal 152 to a third state when the power window switch 138 is not being actuated. The power window switches 112 and 136 similarly generate their respective power window signals.

The PDL switches 116, 132, and 134 generate respective PDL signals based on user input to the respective PDL switches 116, 132, and 134. For example, the PDL switch 134 generates a PDL signal 156 based on user input to the PDL switch 134. The PDL switch 134 may set the PDL signal 156 to a first state when the PDL switch 134 is actuated to a first position (e.g., lock). The PDL switch 134 may set the PDL signal 156 to a second state when the PDL switch 134 is actuated to a second position (e.g., unlock). The PDL switch 134 may set the PDL signal 156 to a third state when the PDL switch 134 is not being actuated. The PDL switches 132 and 134 similarly generate their respective PDL signals.

A control module 170 generally actuates the window actuators and lock actuators of the doors based on the power window and PDL signals. For example, the control module 170 actuates the window actuator 140 of the front driver side door 104 based on the power window signal from the power window switch 112-1. The control module 170 actuates the window actuator 140 of the front driver side door 104 based on the power window signal from the power window switch 112-1. The control module 170 actuates the window actuator 144 of the DSR door 106 based on the power window signal from the power window switch 112-3. The control module 170 also actuates the window actuator 144 of the DSR door 106 based on the power window signal from the power window switch 138. The control module 170 actuates the window actuator 148 of the PSR door 107 based on the power window signal from the power window switch 112-4. The control module 170 also actuates the window actuator 148 of the PSR door 107 based on the power window signal from the power window switch 136.

The control module 170 actuates the lock actuator 142 of the front driver side door 104 based on the PDL signal from the PDL switch 116. The control module 170 also actuates the lock actuators of the other doors, such as the lock actuators 146 and 150 based on the PDL signal from the PDL switch 116. The control module 170 actuates the lock actuator 146 of the DSR door 106 based on the PDL signal 156 from the PDL switch 134. The control module 170 may also actuate the lock actuators of one or more other doors, such as the lock actuator 150 or the lock actuators of all of the doors, based on the PDL signal 156 from the PDL switch 134. The control module 170 actuates the lock actuator 150 of the PSR door 107 based on the PDL signal from the PDL switch 132. The control module 170 may also actuate the lock actuators of one or more other doors, such as the lock actuator 146 or the lock actuators of all of the doors, based on the PDL signal from the PDL switch 132.

The lock actuator 142 can additionally be manually actuated via user input. For example, a user may actuate a lever or other type of actuator located on the interior of the front driver side door 104 to manually lock and unlock the front driver side door 104. Similarly, the lock actuators 146 and 150 can additionally be manually actuated via user input to manually lock and unlock the DSR door 106 and the PSR door 107. In various implementations, the doors (e.g., all doors having a PDL switch) may not include the lever or other actuator that can be actuated for manual locking and unlocking.

The block-out switch 120 generates a block-out signal 174 based on user input to the block-out switch 120. For example, the block-out switch 120 may set the block-out signal 174 to a first state when the block-out switch 120 is in a first position (e.g., block-out). The block-out switch 120 may set the block-out signal 174 to a second state when the PDL switch 134 is in a second position (e.g., no block-out).

While the example of actuatable switches has been provided for the block-out switch 120, the PDL switches, and the power window switches, discrete touch based sensors or other types of input devices may be used to generate the power window signals, the PDL signals, and/or the block-out signal.

Based on the block-out signal 174 from the block-out switch 120 and/or one or more other inputs, the control module 170 may ignore the power window signals from the power window switches 136 and 138 and the PDL signals from the PDL switches 132 and 134 of the rear doors. Additionally or alternatively, the control module 170 may actuate the lock actuators 146 and 150 independently of the PDL signals from the PDL switches 132 and 134 of the rear doors based on one or more other inputs. Examples of other inputs include, for example, vehicle speed, signals from a driver information center (DIC) module 176, signals indicative of whether the rear doors are open or closed, and/or signals indicative of whether the rear doors are locked or unlocked. The DIC module 176 may include a touchscreen display that displays information regarding vehicle settings and other information. The DIC module 176 may generate the signals based on user input to the display.

The DSR door 106 includes a position sensor 178 that generates a position signal 192 indicative of whether the DSR door 106 is open or closed. For example, the position sensor 178 may set the position signal 192 to a first state when the DSR door 106 is open. The position sensor 178 may set the position signal 192 to a second state when the DSR door 106 is closed. The PSR door 107 similarly includes a position sensor 182 that generates a position signal indicative of whether the PSR door 107 is open or closed.

The DSR door 106 includes a lock sensor 186 that generates a lock signal 188 indicative of whether the DSR door 106 is locked or unlocked. For example, the lock sensor 186 may set the lock signal to a first state when the DSR door 106 is locked. The lock sensor 186 may set the lock signal to a second state when the DSR door 106 is unlocked. The PSR door 107 similarly includes a lock sensor 190 that generates a lock signal indicative of whether the PSR door 107 is locked or unlocked.

While the example of one lock actuator per door is provided, two or more lock actuators may be implemented per door to unlock and lock each door. Also, while the example of window actuator per door is provided, two or more window actuators may be implemented per door to open and close the window of each door.

Figure 3:
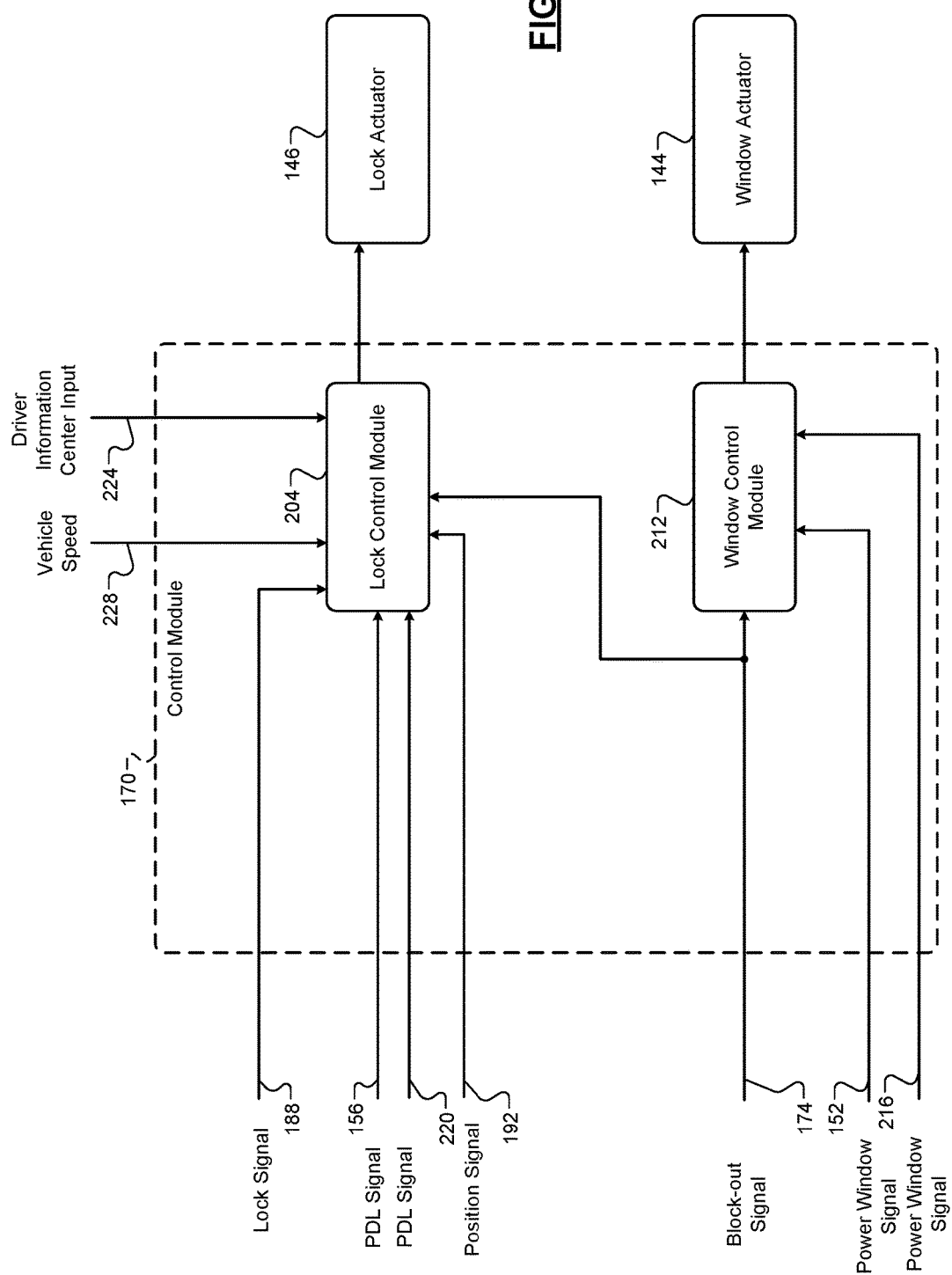
FIG. 3 is a functional block diagram of an example implementation of a control module of a vehicle.

Referring to FIG. 3, a functional block diagram of an example implementation of the control module 170 is presented. While the example of FIG. 3 is shown and will be described in terms of the DSR door 106 the same is equally applicable to the PSR door 107 and the front passenger side door.

The control module 170 includes a lock control module 204 and a window control module 212. The lock control module 204 selectively actuates the lock actuator 146 and locks and unlocks the DSR door 106. The window control module 212 selectively actuates the window actuator 144 and opens and closes the window of the DSR door 106.

More specifically, when the block-out signal 174 is in the second state, the window control module 212 actuates the window actuator 144 and opens the window of the DSR door 106 when the power window signal 152 from the power window switch 138 is in the second state. The window control module 212 actuates the window actuator 144 and closes the window of the DSR door 106 when the power window signal 152 from the power window switch 138 is in the first state and the block-out signal 174 is in the second state.

Regardless of the state of the block-out signal 174, the window control module 212 also opens the window of the DSR door 106 when the power window signal 216 from the power window switch 112-3 of the front driver side door 104 is in the second state. The window control module 212 also actuates the window actuator 144 and closes the window of the DSR door 106 when the power window signal 216 from the power window switch 112-3 of the front driver side door 104 is in the first state regardless of the state of the block-out signal 174.

When the block-out signal 174 is in the first state, however, the window control module 212 ignores the power window signal 152 from the power window switch 138. More specifically, when the block-out signal 174 is in the first state, the window control module 212 does not actuate the window actuator 144 to open the window of the DSR door 106 when the power window signal 152 from the power window switch 138 is in the second state. When the block-out signal 174 is in the first state, the window control module 212 does not actuate the window actuator 144 to close the window of the DSR door 106 when the power window signal 152 from the power window switch 138 is in the first state. In this way, the window control module 212 controls actuation of the window actuator 144 independently of the power window signal 152 when the block-out signal 174 is in the first state.

Similarly, when the block-out signal 174 is in the second state, the lock control module 204 actuates the lock actuator 146 and locks the DSR door 106 when the PDL signal 156 from the PDL switch 134 is in the first state. The lock control module 204 actuates the lock actuator 146 and unlocks the DSR door 106 when the PDL signal 156 from the PDL switch 134 is in the second state and the block-out signal 174 is in the second state.

Regardless of the state of the block-out signal 174, the lock control module 204 actuates the lock actuator 146 and locks the DSR door 106 when the PDL signal 220 from the PDL switch 116 is in the first state. The lock control module 204 actuates the lock actuator 146 and unlocks the DSR door 106 when the PDL signal 220 from the PDL switch 116 is in the second state regardless of the state of the block-out signal 174.

When the block-out signal 174 is in the first state, however, the lock control module 204 ignores the PDL signal 156 from the PDL switch 134. More specifically, when the block-out signal 174 is in the first state, the lock control module 204 does not actuate the lock actuator 146 and unlock the DSR door 106 when the PDL signal 156 from the PDL switch 134 is in the first state. When the block-out signal 174 is in the first state, the lock control module 204 does not actuate the lock actuator 146 and lock the DSR door 106 when the PDL signal 156 from the PDL switch 134 is in the second state. In this way, the lock control module 204 controls actuation of the lock actuator 146 independently of the PDL signal 156 when the block-out signal 174 is in the first state.

In various implementations, when the block-out signal 174 is in the first state, the lock control module 204 may only ignore requests via the PDL signal 156 to unlock the DSR door 106. In other words, when the block-out signal 174 is in the first state, the lock control module 204 does not actuate the lock actuator 146 and unlock the DSR door 106 when the PDL signal 156 from the PDL switch 134 is in the first state. However, the lock control module 204 actuates the lock actuator 146 and locks the DSR door 106 when the PDL signal 156 from the PDL switch 134 is in the second state and the block-out signal 174 is in the first state.

Additionally or alternatively, the lock control module 204 may ignore the block-out signal 174 when the DSR door 106 is open. For example, the lock control module 204 actuates the lock actuator 146 and locks the DSR door 106 when the PDL signal 156 is in the first state regardless of the state of the block-out signal 174. Additionally, the lock control module 204 actuates the lock actuator 146 and unlocks the DSR door 106 when the PDL signal 156 is in the second state regardless of the state of the block-out signal 174. As discussed above, the position signal 192 indicates whether the DSR door 106 is open or closed.

Additionally or alternatively to the use of the block-out signal 174, whether to ignore the PDL signal 156 from the PDL switch 134 may be selected via the DIC. For example, DIC input 224 may indicate whether to ignore the PDL signal 156 from the PDL switch 134. The DIC module 176 may generate the DIC input 224 based on user interaction (e.g., touching) of the display of the DIC module 176. The DIC module 176 may allow user selection, for each door, of whether to ignore the PDL signal of the PDL switch of that door.

The DIC module 176 may set the DIC input 224 to a first state to ignore (and not actuate the lock actuator 146) the PDL signal 156 from the PDL switch 134. The DIC module 176 may set the DIC input 224 to a second state to actuate the lock actuator 146 based on the PDL signal 156 from the PDL switch 134. When the DIC input 224 is in the first state, the lock control module 204 controls the lock actuator 146 the same as if the block-out signal 174 is in the first state, as described above. When the DIC input 224 is in the second state, the lock control module 204 controls the lock actuator 146 the same as if the block-out signal 174 is in the second state, as described above. In various implementations, the DIC module 176 may display the ability to provide the DIC input 224 for the DSR door 106 in response to the DSR door 106 being unlocked at the DSR door 106. The unlocking may be manual (e.g., via user actuation of the lock actuator 146) or automatic based on the PDL signal 156. As discussed above, the lock signal 188 indicates whether the DSR door 106 is locked or unlocked.

Additionally or alternatively, when the block-out signal 174 is in the first state, the lock control module 204 may actuate the lock actuator 146 and lock the DSR door 106 when the DSR door 106 is unlocked. For example, the lock control module 204 may actuate the lock actuator 146 and lock the DSR door 106 in response to the DSR door 106 transitioning from locked to unlocked. As another example, the lock control module 204 may actuate the lock actuator 146 and lock the DSR door 106 when a predetermined period has passed after the DSR door 106 transitions from locked to unlocked. In this example, the lock control module 204 may start a timer when the DSR door 106 transitioned from locked to unlocked and actuate the lock actuator 146 and lock the DSR door 106 when the timer reaches the predetermined period.

Additional or alternative to the use of the block-out signal 174, the lock control module 204 may determine whether to ignore the PDL signal 156 from the PDL switch 134 based on a vehicle speed 228. The vehicle speed 228 may be determined, for example, based on one or more wheel speeds measured using wheel speed sensors. For example, a vehicle speed module may set the vehicle speed 228 based on an average of two or more wheel speeds.

The lock control module 204 may ignore the PDL signal 156 when the vehicle speed 228 is greater than a predetermined speed. The lock control module 204 may ignore the PDL signal 156 when the vehicle speed 228 is less than the predetermined speed. The predetermined speed may be calibratable and may be, for example, 5 miles per hour or another suitable speed. The lock control module 204 may also actuate the lock actuator 146 and lock the DSR door 106 when the vehicle speed 228 is greater than the predetermined speed.

Figure 4:
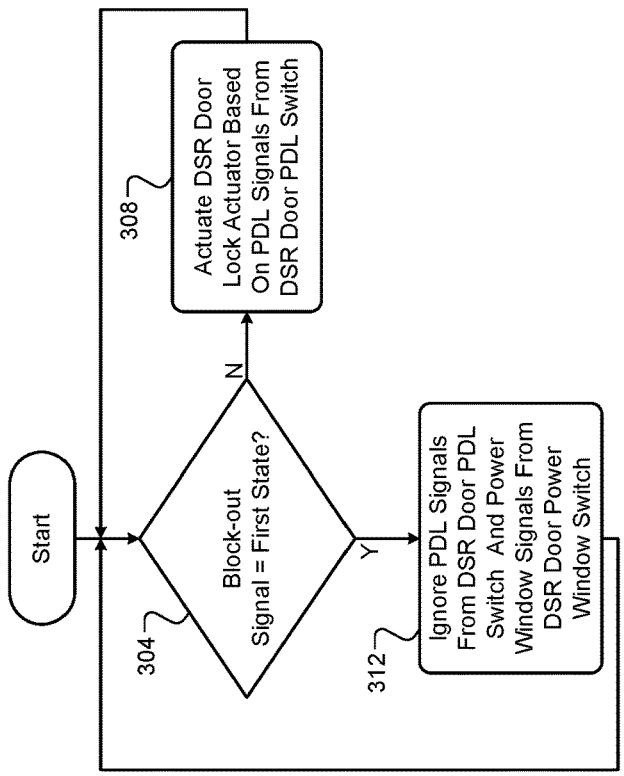

Referring to FIG. 4, a flowchart depicting an example method of controlling locking and unlocking is shown. At 304, the lock control module 204 determines whether the block-out signal 174 from the block-out switch 120 is in the first state. If 304 is false, the lock control module 204 actuates the lock actuator 146 based on the PDL signal 156 from the PDL switch 134 at 308, and control may return to 304. For example, the lock control module 204 actuates the lock actuator 146 and locks the DSR door 106 when the PDL signal 156 is in the first state. The lock control module 204 actuates the lock actuator 146 and unlocks the DSR door 106 when the PDL signal 156 is in the second state.

Also at 308, the window control module 212 controls actuation of the window actuator 144 based on the power window signal 152. For example, the window control module 212 actuates the window actuator 144 and opens the window of the DSR door 106 when the power window signal 152 is in the second state. The window control module 212 actuates the window actuator 144 and closes the window of the DSR door 106 when the power window signal 152 is in the first state.

If 304 is true, the lock control module 204 ignores the PDL signal 156 from the PDL switch 134 at 312, and control may return to 304. For example, the lock control module 204 may not actuate the lock actuator 146 and not lock the DSR door 106 when the PDL signal 156 is in the first state. The lock control module 204 may also not actuate the lock actuator 146 and unlock the DSR door 106 when the PDL signal 156 is in the second state.

In various implementations, at 312, the lock control module 204 may ignore only requests to unlock received via the PDL signal 156. For example, the lock control module 204 may not actuate the lock actuator 146 and unlock the DSR door 106 when the PDL signal 156 is in the second state. However, the lock control module 204 may actuate the lock actuator 146 and lock the DSR door 106 when the PDL signal 156 is in the first state.

Also at 312, the window control module 212 ignores the power window signal 152 from the power window switch 138. For example, the window control module 212 may not actuate the window actuator 144 and not open the window of the DSR door 106 when the power window signal 152 is in the second state. The window control module 212 may not actuate the window actuator 144 and not close the window of the DSR door 106 when the power window signal 152 is in the first state.

Figure 5:
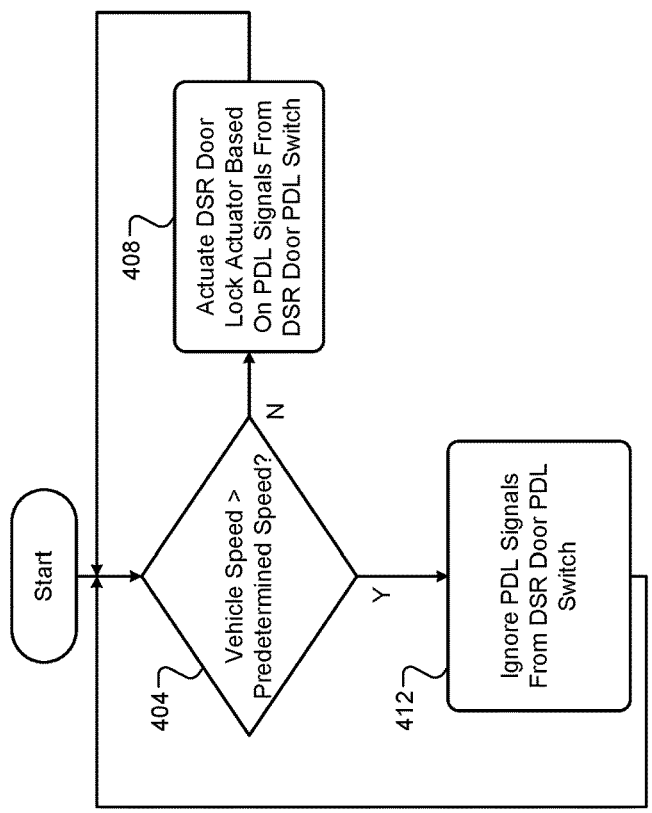
FIGS. 4-8 are flowcharts depicting example methods of controlling locking and unlocking of rear doors of a vehicle.

Referring to FIG. 5, a flowchart depicting an example method of controlling locking and unlocking is shown. At 404, the lock control module 204 determines whether the vehicle speed 228 is greater than the predetermined speed. If 404 is false, the lock control module 204 actuates the lock actuator 146 based on the PDL signal 156 from the PDL switch 134 at 408, and control may return to 404. For example, the lock control module 204 actuates the lock actuator 146 and locks the DSR door 106 when the PDL signal 156 is in the first state. The lock control module 204 actuates the lock actuator 146 and unlocks the DSR door 106 when the PDL signal 156 is in the second state.

If 404 is true, the lock control module 204 ignores the PDL signal 156 from the PDL switch 134 at 412, and control may return to 404. For example, the lock control module 204 may not actuate the lock actuator 146 and not lock the DSR door 106 when the PDL signal 156 is in the first state. The lock control module 204 may also not actuate the lock actuator 146 and unlock the DSR door 106 when the PDL signal 156 is in the second state. Additionally, when the vehicle speed 228 transitions from less than the predetermined speed to greater than the predetermined speed, the lock control module 204 may actuate the lock actuator 146 and lock the DSR door 106 at 412.

Figure 6:
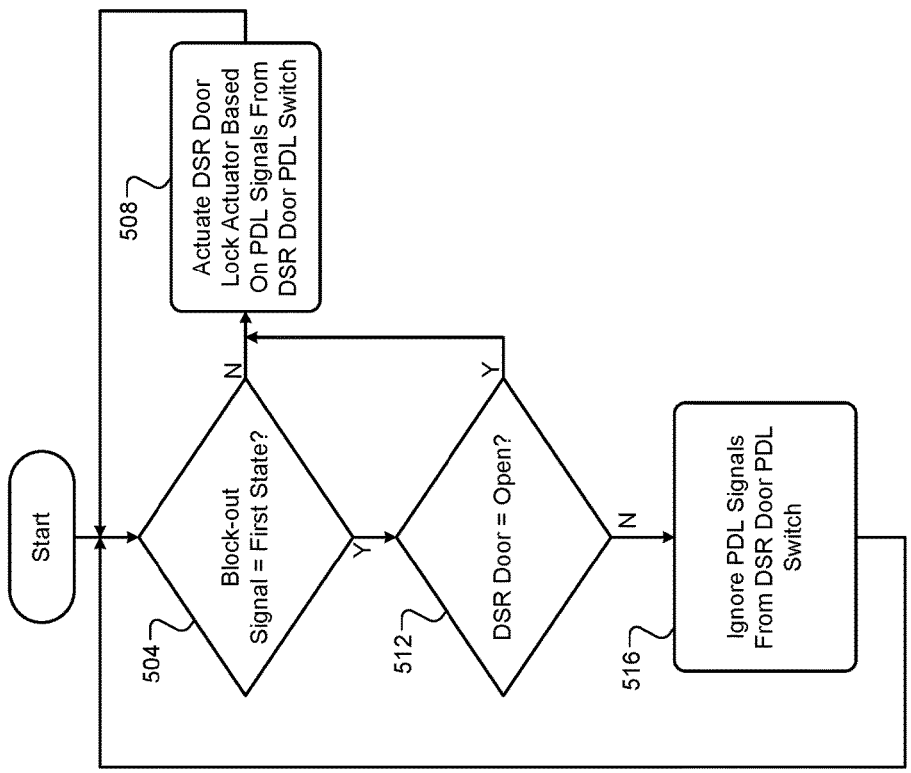

Referring to FIG. 6, a flowchart depicting an example method of controlling locking and unlocking is shown. At 504, the lock control module 204 determines whether the block-out signal 174 from the block-out switch 120 is in the first state. If 504 is false, the lock control module 204 actuates the lock actuator 146 based on the PDL signal 156 from the PDL switch 134 at 508, and control may return to 504. For example, the lock control module 204 actuates the lock actuator 146 and locks the DSR door 106 when the PDL signal 156 is in the first state. The lock control module 204 actuates the lock actuator 146 and unlocks the DSR door 106 when the PDL signal 156 is in the second state.

If 504 is true, control continues with 512. At 512, the lock control module 204 determines whether the DSR door 106 is open. For example, the lock control module 204 may determine whether the position signal 192 is in the first state at 512. If 512 is true, control may transfer to 508, as discussed above. If 512 is false, control continues with 516. At 516, the lock control module 204 ignores the PDL signal 156 from the PDL switch 134, and control may return to 504. For example, the lock control module 204 may not actuate the lock actuator 146 and not lock the DSR door 106 when the PDL signal 156 is in the first state. The lock control module 204 may also not actuate the lock actuator 146 and unlock the DSR door 106 when the PDL signal 156 is in the second state.

Figure 7:
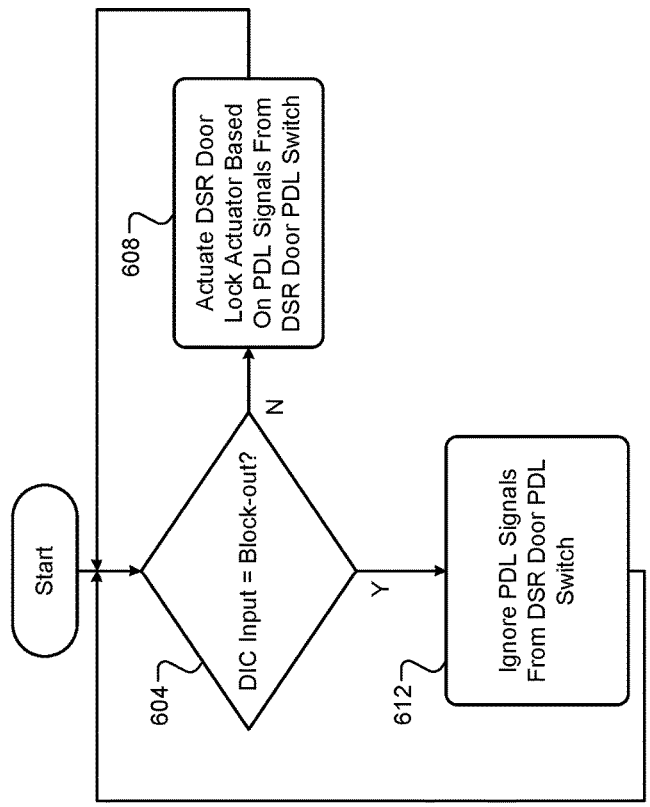

Referring to FIG. 7, a flowchart depicting an example method of controlling locking and unlocking is shown. At 604, the lock control module 204 determines whether the DIC input 224 indicates to ignore the PDL signal 156 from the PDL switch 134. For example, the lock control module

204 may determine whether the DIC input 224 is in the first state at 604. If 604 is false, the lock control module 204 actuates the lock actuator 146 based on the PDL signal 156 from the PDL switch 134 at 608, and control may return to 604. For example, the lock control module 204 actuates the lock actuator 146 and locks the DSR door 106 when the PDL signal 156 is in the first state. The lock control module 204 actuates the lock actuator 146 and unlocks the DSR door 106 when the PDL signal 156 is in the second state.

If 604 is true, the lock control module 204 ignores the PDL signal 156 from the PDL switch 134 at 612, and control may return to 604. For example, the lock control module 204 may not actuate the lock actuator 146 and not lock the DSR door 106 when the PDL signal 156 is in the first state. The lock control module 204 may also not actuate the lock actuator 146 and unlock the DSR door 106 when the PDL signal 156 is in the second state.

Figure 8:
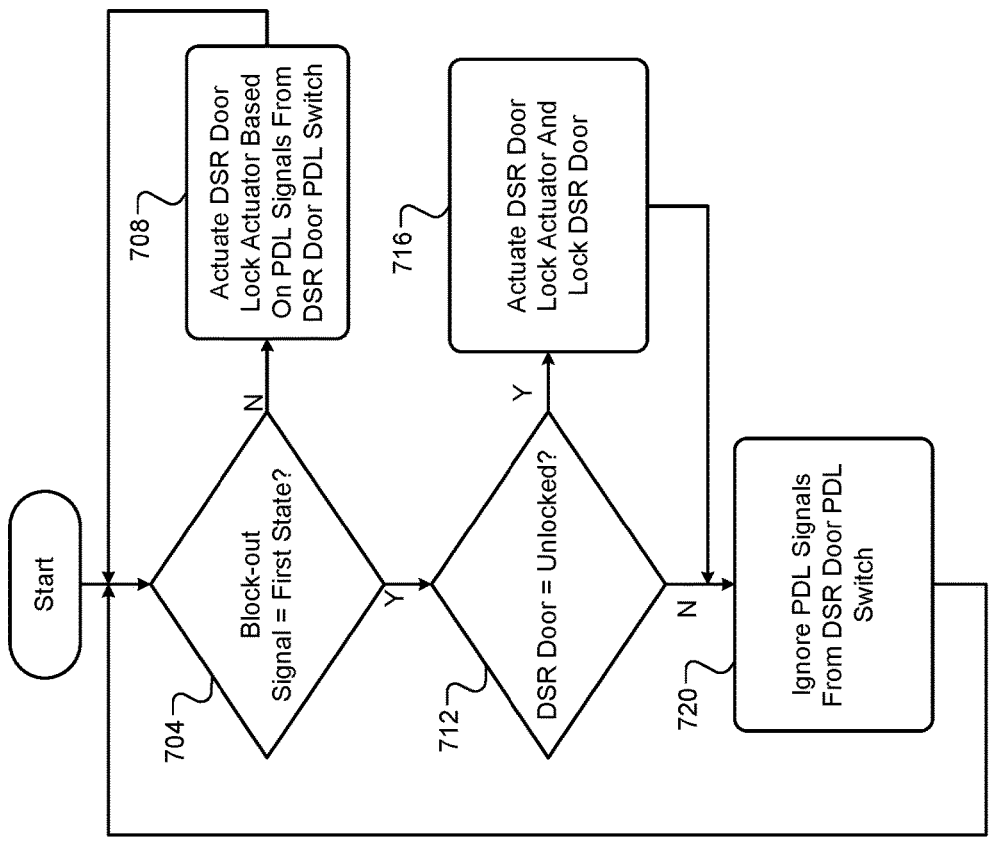

Referring to FIG. 8, a flowchart depicting an example method of controlling locking and unlocking is shown. At 704, the lock control module 204 determines whether the block-out signal 174 from the block-out switch 120 is in the first state. If 704 is false, the lock control module 204 actuates the lock actuator 146 based on the PDL signal 156 from the PDL switch 134 at 708, and control may return to 704. For example, the lock control module 204 actuates the lock actuator 146 and locks the DSR door 106 when the PDL signal 156 is in the first state. The lock control module 204 actuates the lock actuator 146 and unlocks the DSR door 106 when the PDL signal 156 is in the second state.

If 704 is true, control continues with 712. At 712, the lock control module 204 determines whether the DSR door 106 is unlocked or has transitioned from locked to unlocked. For example, the lock control module 204 may determine whether the lock signal 188 is in the second state at 712. If 712 is true, the lock control module 204 may actuate the lock actuator 146 and lock the DSR door 106 at 716, and control may continue with 720. The lock control module 204 may actuate the lock actuator 146 and lock the DSR door 106 immediately at 716 or the predetermined period after the DSR door 106 is unlocked. At 720, the lock control module 204 ignores the PDL signal 156 from the PDL switch 134, and control may return to 704. For example, the lock control module 204 may not actuate the lock actuator 146 and not lock the DSR door 106 when the PDL signal 156 is in the first state. The lock control module 204 may also not actuate the lock actuator 146 and unlock the DSR door 106 when the PDL signal 156 is in the second state.

While the examples of FIGS. 4-8 are shown separately, a combination of two, more than two, or all of the examples of FIGS. 4-8 may be implemented by the control module 170. Additionally, while unlocking and locking of only the DSR door 106 is discussed, the examples of FIGS. 3-8 are also applicable to locking and unlocking all of the other doors or unlocking only a subset of the doors (e.g., only the rear doors) based on the PDL signal 156.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A window and lock control system of a vehicle, comprising:
    a window control module configured to:
        when a first signal from a block-out switch of the vehicle is in a first state, actuate a window actuator of a rear door of the vehicle based on a second signal from a power window switch of the rear door; and
        when the first signal from the block-out switch is in a second state, not actuate the window actuator of the rear door based on the second signal from the power window switch of the rear door; and
    a lock control module configured to:
        when the first signal from the block-out switch is in the first state, actuate a lock actuator of the rear door and lock and unlock the rear door based on a third signal from a power door lock (PDL) switch of the rear door; and
        when the first signal from the block-out switch is in the second state, selectively not actuate the lock actuator of the rear door based on the third signal from the PDL switch of the rear door,
    wherein the lock control module is further configured to:
        when the first signal from the block-out switch is in the second state and the rear door is open:
            actuate the lock actuator of the rear door and lock the rear door when the third signal from the PDL switch of the rear door is in a first state; and
            actuate the lock actuator of the rear door and unlock the rear door when the third signal from the PDL switch of the rear door is in a second state; and
        when the first signal from the block-out switch is in the second state and the rear door is not open:
            not actuate the lock actuator of the rear door and not lock the rear door when the third signal from the PDL switch of the rear door is in the first state; and
            not actuate the lock actuator of the rear door and not unlock the rear door when the third signal from the PDL switch of the rear door is in the second state.

2. The window and lock control system of claim 1 wherein the lock control module is further configured to:
    when the first signal from the block-out switch is in the first state:
        actuate the lock actuator of the rear door and lock the rear door when the third signal from the PDL switch of the rear door is in the first state; and
        actuate the lock actuator of the rear door and unlock the rear door when the third signal from the PDL switch of the rear door is in the second state; and
    when the first signal from the block-out switch is in the second state:
        actuate the lock actuator of the rear door and lock the rear door when the third signal from the PDL switch of the rear door is in the first state; and
        not actuate the lock actuator of the rear door and not unlock the rear door when the third signal from the PDL switch of the rear door is in the second state.

3. The window and lock control system of claim 1 wherein the lock control module is further configured to:
    when the first signal from the block-out switch is in the first state:
    actuate the lock actuator of the rear door and lock the rear door when the third signal from the PDL switch of the rear door is in the first state; and
    actuate the lock actuator of the rear door and unlock the rear door when the third signal from the PDL switch of the rear door is in the second state; and when the first signal from the block-out switch is in the second state:
not actuate the lock actuator of the rear door and not lock the rear door when the third signal from the PDL switch of the rear door is in the first state; and
not actuate the lock actuator of the rear door and not unlock the rear door when the third signal from the PDL switch of the rear door is in the second state.

4. The window and lock control system of claim 1 wherein the lock control module is further configured to:
when a fourth signal indicative of user input for the rear door is in a first state:
not actuate the lock actuator of the rear door and not lock the rear door when the third signal from the PDL switch of the rear door is in the first state; and
not actuate the lock actuator of the rear door and not unlock the rear door when the third signal from the PDL switch of the rear door is in the second state; and
when the fourth signal is in a second state:
actuate the lock actuator of the rear door and lock the rear door when the third signal from the PDL switch of the rear door is in the first state; and
actuate the lock actuator of the rear door and unlock the rear door when the third signal from the PDL switch of the rear door is in a second state.

5. The window and lock control system of claim 1 wherein the lock control module is further configured to, independently of the third signal from the PDL switch of the rear door, actuate the lock actuator of the rear door and lock the rear door when a vehicle speed is greater than a predetermined speed.

6. The window and lock control system of claim 1 wherein the lock control module is further configured to:
when the first signal from the block-out switch is in the second state, selectively actuate the lock actuator of the rear door independently of the third signal from the PDL switch of the rear door in response to a determination that the rear door is unlocked.

7. The window and lock control system of claim 1 wherein the lock control module is further configured to:
when the first signal from the block-out switch is in the second state, selectively actuate the lock actuator of the rear door independently of the third signal from the PDL switch of the rear door a predetermined period after the rear door transitions from locked to unlocked.

8. The window and lock control system of claim 1 wherein the lock control module is further configured to:
when the first signal from the block-out switch is in the first state, further actuate a second lock actuator of a front door and lock and unlock the front door based on the third signal from the PDL switch of the rear door; and
when the first signal from the block-out switch is in the second state, selectively not actuate the second lock actuator of the front door based on the third signal from the PDL switch of the rear door.

9. The window and lock control system of claim 8 wherein the lock control module is further configured to, independently of the first signal from the block-out switch:
actuate the lock actuator of the rear door and lock the rear door when a fourth signal from a second PDL switch of the front door is in a first state; and
actuate the lock actuator of the rear door and unlock the rear door when the fourth signal from the second PDL switch of the front door is in a second state.

10. A window and lock control method of a vehicle, comprising:
when a first signal from a block-out switch of the vehicle is in a first state, actuating a window actuator of a rear door of the vehicle based on a second signal from a power window switch of the rear door;
when the first signal from the block-out switch is in a second state, not actuating the window actuator of the rear door based on the second signal from the power window switch of the rear door;
when the first signal from the block-out switch is in the first state, actuating a lock actuator of the rear door and locking and unlocking the rear door based on a third signal from a power door lock (PDL) switch of the rear door;
when the first signal from the block-out switch is in the second state, selectively not actuating the lock actuator of the rear door based on the third signal from the PDL switch of the rear door;
when the first signal from the block-out switch is in the second state and the rear door is open:
actuating the lock actuator of the rear door and locking the rear door when the third signal from the PDL switch of the rear door is in a first state; and
actuating the lock actuator of the rear door and unlocking the rear door when the third signal from the PDL switch of the rear door is in a second state; and
when the first signal from the block-out switch is in the second state and the rear door is not open:
not actuating the lock actuator of the rear door and not locking the rear door when the third signal from the PDL switch of the rear door is in the first state; and
not actuating the lock actuator of the rear door and not unlocking the rear door when the third signal from the PDL switch of the rear door is in the second state.

11. The method of claim 10 wherein:
when the first signal from the block-out switch is in the first state, actuating the lock actuator of the rear door and locking and unlocking the rear door based on the third signal from the PDL switch of the rear door includes:
actuating the lock actuator of the rear door and locking the rear door when the third signal from the PDL switch of the rear door is in the first state; and
actuating the lock actuator of the rear door and unlocking the rear door when the third signal from the PDL switch of the rear door is in the second state; and
when the first signal from the block-out switch is in the second state, selectively not actuating the lock actuator of the rear door based on the third signal from the PDL switch of the rear door includes:
actuating the lock actuator of the rear door and locking the rear door when the third signal from the PDL switch of the rear door is in the first state; and
not actuating the lock actuator of the rear door and not unlocking the rear door when the third signal from the PDL switch of the rear door is in the second state.

12. The method of claim 10 wherein:
when the first signal from the block-out switch is in the first state, actuating the lock actuator of the rear door and locking and unlocking the rear door based on the third signal from the PDL switch of the rear door includes:
actuating the lock actuator of the rear door and locking the rear door when the third signal from the PDL switch of the rear door is in the first state; and actuating the lock actuator of the rear door and unlocking the rear door when the third signal from the PDL switch of the rear door is in the second state; and when the first signal from the block-out switch is in the second state, selectively not actuating the lock actuator of the rear door based on the third signal from the PDL switch of the rear door includes:

not actuating the lock actuator of the rear door and not locking the rear door when the third signal from the PDL switch of the rear door is in the first state; and not actuating the lock actuator of the rear door and not unlocking the rear door when the third signal from the PDL switch of the rear door is in the second state.

13. The method of claim 10 further comprising:

when a fourth signal indicative of user input for the rear door is in a first state:

not actuating the lock actuator of the rear door and not locking the rear door when the third signal from the PDL switch of the rear door is in the first state; and not actuating the lock actuator of the rear door and not unlocking the rear door when the third signal from the PDL switch of the rear door is in the second state; and when the fourth signal is in a second state:

actuating the lock actuator of the rear door and locking the rear door when the third signal from the PDL switch of the rear door is in the first state; and actuating the lock actuator of the rear door and unlocking the rear door when the third signal from the PDL switch of the rear door is in a second state.

14. The method of claim 10 further comprising, independently of the third signal from the PDL switch of the rear door, actuating the lock actuator of the rear door and locking the rear door when a vehicle speed is greater than a predetermined speed.

15. The method of claim 10 further comprising, when the first signal from the block-out switch is in the second state, selectively actuating the lock actuator of the rear door independently of the third signal from the PDL switch of the rear door in response to a determination that the rear door is unlocked.

16. The method of claim 10 further comprising, when the first signal from the block-out switch is in the second state, selectively actuating the lock actuator of the rear door independently of the third signal from the PDL switch of the rear door a predetermined period after the rear door transitions from locked to unlocked.

17. The method of claim 10 further comprising:

when the first signal from the block-out switch is in the first state, actuating a second lock actuator of a front door and locking and unlocking the front door based on the third signal from the PDL switch of the rear door; and when the first signal from the block-out switch is in the second state, selectively not actuating the second lock actuator of the front door based on the third signal from the PDL switch of the rear door.

18. The method of claim 17 further comprising, independently of the first signal from the block-out switch:

actuating the lock actuator of the rear door and locking the rear door when a fourth signal from a second PDL switch of the front door is in a first state; and actuating the lock actuator of the rear door and unlocking the rear door when the fourth signal from the second PDL switch of the front door is in a second state.

* * * * *